UNITED STATES PATENT OFFICE.

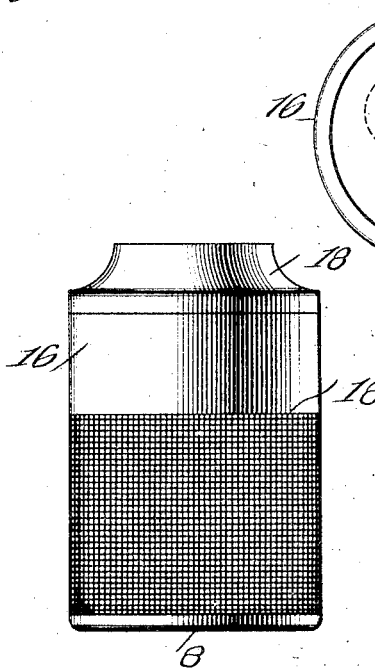

EDWARD H. MONAGHAN, OF RICHMOND, CALIFORNIA.

DRILL-CHUCK.

1,068,263.     Specification of Letters Patent.     Patented July 22, 1913.

Application filed October 23, 1912. Serial No. 727,313.

*To all whom it may concern:*

Be it known that I, EDWARD H. MONAGHAN, a citizen of the United States, and a resident of Richmond, in the county of Contra Costa and State of California, have invented a new and useful Improvement in Drill-Chucks, of which the following is a specification.

My invention relates to chucks, such as are adapted for use upon drills and lathes for the purpose of securing a bit or other transient revoluble tool in position to turn upon its own axis in order to operate upon a piece of work to be cut or drilled.

More particularly stated, my invention comprehends a number of separate improvements relative to strengthening the chuck to render exact the centering of the bit, to shortening the space between the gripping portion of the chuck and the effective or cutting portion of the drill bit, to prevent the gripping surface of the chuck from slipping relatively to the bit, and to diminish the minimum distance between adjacent gripping surface of the chuck in order to enable the chuck to grasp a smaller bit shank; and also to limit positively the angular travel of the sleeve of the chuck relatively to the shank, as well as to insure positiveness in the normal position of the sleeve and shank relative to each other.

Reference is made to the accompanying drawing forming a part of this specification, and in which like letters indicate like parts, Figure 1 is a side elevation of a drill chuck embodying my invention; Fig. 2 is a view partly in section showing the internal mechanism of the chuck; Fig. 3 is a section on the line 3—3 of Fig. 2; Fig. 4 is a section on the line 4—4 of Fig. 2; Fig. 5 is a detail showing a section through the inner member of the chuck, the same being provided with roller passages; Fig. 6 is an inverted plan or bottom view of the chuck. Fig. 7 is a section on the line 7—7 of Fig. 2, looking in the direction of the arrow.

A spindle is shown at 5 and is provided with an enlarged threaded portion 6. A sleeve 7 which I designate as the inner sleeve or inner member of the chuck is threaded internally at its upper end and fitted to the threaded portion 6 of the drill shank. The sleeve 7 is provided with a reduced portion 7ª, and also with a head 8 of substantially annular form integral with it. The sleeve 7 is further provided with a groove 9, separating the reduced portion 7ª from the main body portion of the sleeve. The sleeve 7 is also provided with a plurality of roller passages 10, each having the form of a slot, one end of the slot being flat, while the opposite end 12 is concave—somewhat upon the order of the inner surface of a semi-cylinder, as will be understood from Fig. 5. A roller 13 is mounted in each roller passage 10. This roller is provided at one of its ends with a flat portion 15 mating the adjacent bounding surface of the roller passage 10, and at its opposite end is provided with a substantially hemispherical or rounded surface 14 mating the concave surface 12.

Encircling the sleeve 7 is a larger sleeve 16 which is the outer sleeve of the chuck. It is provided with an annular groove 17. A collar 18 is fitted tightly upon the upper portion 7ª of the sleeve 7 and bears upon the adjacent edge of the sleeve 16. The groove 9 of the sleeve 7 merges into and forms practically a continuation of the annular groove 17 and forms therewith a compartment of annular form. Mounted within this compartment is an overcoil spring 19 having one of its ends 20 secured to the sleeve 16, and its opposite end 21 secured to the sleeve 7, as will be understood from Fig. 3.

The sleeve 16 is provided with an annular clearance channel 22 disposed adjacent to the flat ends 15 of the rollers 13. The purpose of this clearance channel is to give the adjacent ends of the rollers 13 a slight freedom of movement, in order that the rollers may perform, as nearly as practicable, pure rolling movements and may be free from any disturbing or dragging motion due to contact between the flat ends of the rollers 13 and other flat surfaces parallel therewith and adjacent thereto. The sleeve 16 is further provided with an annular shoulder 23 against which the annular head 8 of the inner sleeve 7 may stop, as indicated in Fig. 2. The head 8 is provided with an opening 24 through which the shank of the drill bit is inserted into the chuck. The sleeve 16 is provided with inclined internal surfaces or walls 25 to be engaged by the rollers in order that rotation of the sleeve 16 relatively to the sleeve 7 may not only turn the rollers, but force them bodily inward toward a common center, as will be understood from Fig. 4. Each roller 13 is provided with score lines 26 so cut into the roller as to render it rough, the lines being slightly spiral. The purpose in rendering the score lines spiral is to insure a good frictional contact between the rollers and the shank of the drill bit. If the score lines were strictly parallel with the axes of the rollers, it might happen that a roller would stop in such a position that the gripping surface it presented, relatively to the shank of the drill bit, might be either the score line itself or the space or surface between two adjacent score lines. This would lead to uncertainty as to the character of gripping surface to be presented in a particular instance by a roller, and also uncertainty as to the exact centering of the drill shank. These undesirable features are avoided by rendering the score lines spiral, because with this construction each roller presents always a gripping surface which never varies as to its increase, and the centering of the drill shank is insured by the fact that the gripping zone of the rollers always corresponds with the pitch lines thereof.

My purpose in rendering the ends 14 of the rollers convex is practically to sink the rollers partially into the annular head 8, and in so doing, to give the head 8 as much strength as possible. In doing these things, I virtually bring the tension operating or gripping surfaces of the rollers as near as possible to the end of the chuck.

With the construction above described, the degree of rotation of the sleeve 7 relatively to the sleeve 16 is only about 90°—that is, about one fourth of a revolution. The rollers actuating under the torsional effect of the spring 19 are free to turn in one direction until they touch each other, and when the sleeve 16 is turned in a proper direction to separate the rollers, they are free to move outwardly until they reach the thinnest portions of the wall of the sleeve 16, and after doing this they can travel no farther. The rollers, therefore, in moving apart from each other have a limit of travel, but in moving toward each other they have practically no limit as they are free to close together. This arrangement enables the chuck to receive and hold a drill bit of comparatively large size, and also to close upon a drill bit as small as could possibly be gripped by means of rollers of substantially cylindrical form.

The operation of my device is as follows:—The parts being assembled, as indicated, the operator inserts a shank of a bit through the opening 24, and between the rollers 13, and for this purpose turns the sleeve 16 relatively to the sleeve 7. The bit being inserted the torsion of the spring 19 turns the sleeve 16, thus causing the rollers 13 to roll against the sloping or inclined walls 25 and securely grip the bit in position. To release the bit, the sleeve 16 is again turned which allows the bit to fall out of the chuck.

It will be noted that the chuck above described possesses great strength combined with simplicity. It has no parts secured together by screws, and in consequence of the spring 19 has practically an infinite number of bearings for engaging a drill shank. The chuck presents very little idle space between the rollers and the work, and the travel of the sleeve 16 is limited to about one-fourth of a turn.

I do not limit myself to the precise construction shown as variations may be made therein without departing from the spirit of my invention, as set forth in the appended claim. Neither do I limit myself to the use of my device in connection with the spindle 5 which in this particular relation is associated with an air driven motor. Any other spindle or shank suitable for the purpose may be used instead of the spindle 5.

Having thus described my invention what I claim as new and desire to secure by Letters Patent is as follows:—

In a chuck, the combination of an outer sleeve provided with an annular shoulder, an inner sleeve concentric to said outer sleeve, an annular head carried by said inner sleeve and fitting against said shoulder thereof, said head being provided with a plurality of concave surfaces, said inner and outer sleeves being provided with roller passages in registry with said concave surfaces, and a plurality of rollers mounted within said roller passages, each roller being provided with a smooth rounded surface for engaging said concave surface carried by said head, and further provided with a roughened surface comprising score lines extending nearly, but not quite, parallel with the axes of rotation of the rollers.

EDWARD H. MONAGHAN.

Witnesses:
D. ANDERSON,
GEORGE GALBRAITH.